(12) United States Patent
 Xu

(10) Patent No.: US 12,696,889 B2
(45) Date of Patent: Aug. 4, 2026

(54) WATER PRESSURE RELEASER

(71) Applicant: Victory Outdoor Products Company, Yangjiang city (CN)

(72) Inventor: Zhenfeng Xu, Yangjiang City (CN)

( * ) Notice: Subject to any disclaimer, the term of this patent is extended or adjusted under 35 U.S.C. 154(b) by 172 days.

(21) Appl. No.: 19/027,611

(22) Filed: Jan. 17, 2025

(65) Prior Publication Data

US 2026/0198471 A1     Jul. 16, 2026

(30) Foreign Application Priority Data

Jan. 14, 2025    (CN) ......................... 202520074603.X

(51) Int. Cl.
 A01K 99/00      (2006.01)
 A01K 97/20      (2006.01)
 B63C 11/52      (2006.01)

(52) U.S. Cl.
 CPC .............. A01K 99/00 (2013.01); A01K 97/20 (2013.01); B63C 11/52 (2013.01)

(58) Field of Classification Search
 CPC ......... A01K 97/20; A01K 99/00; B63C 11/52
 See application file for complete search history.

(56) References Cited

U.S. PATENT DOCUMENTS

| | | | | |
|---|---|---|---|---|
| 4,841,666 A | * | 6/1989 | Dallas | A01K 83/00 |
| | | | | 43/43.16 |
| 5,022,013 A | * | 6/1991 | Dalton | B63B 22/06 |
| | | | | 367/4 |
| 7,874,096 B2 | * | 1/2011 | Callaway | A01K 97/00 |
| | | | | 43/4.5 |
| 2015/0027030 A1 | * | 1/2015 | Huebner | A01K 95/00 |
| | | | | 43/4 |
| 2015/0164058 A1 | * | 6/2015 | Parks | A01K 83/06 |
| | | | | 43/43.1 |

FOREIGN PATENT DOCUMENTS

| | | | | | |
|---|---|---|---|---|---|
| CN | 106379503 A | * | 2/2017 | ............ | B63C 11/52 |
| CN | 109050834 A | * | 12/2018 | ............ | B63C 11/52 |
| CN | 114180009 A | * | 3/2022 | ............ | B63C 11/52 |

* cited by examiner

*Primary Examiner* — Michael H Wang
(74) *Attorney, Agent, or Firm* — Sandy Lipkin

(57) ABSTRACT

The present application discloses a water pressure releaser, and relates to the field of underwater equipment. The water pressure releaser includes a shell, a movable limiting mechanism is mounted in a middle inside the shell, the shell is a hollow structure, a top groove is formed on an outer wall of a top of the shell, and side grooves are formed on outer walls of two sides of the shell. According to the present application, when the water pressure releaser is in a set water depth, the water pressure enables the air cylinder to move along a direction of the bearing column, so that the entire limiting mechanism is driven to move to release the limit on the clamping mechanism, and under the action of the second torsion spring, the two clamping pincers are disengaged and bounced open to achieve the deep water unlocking function.

6 Claims, 4 Drawing Sheets

WATER PRESSURE RELEASER

REFERENCE TO PRIOR APPLICATION

This application claims priority to Chinese Patent Application 202520074603.X, filed on Jan. 14, 2025, which is incorporated herein by reference.

TECHNICAL FIELD

The present application relates to the field of underwater equipment, and specifically to a water pressure releaser.

BACKGROUND

When ecological study is performed on ocean or lake, it is often necessary to capture fish in the ocean or lake and judge the environment of the ocean or lake based on the state of the fish. In the process of capturing fish, a water pressure releaser is often required. The water pressure releaser can continuously control dragging of the fish before a set water pressure is reached, making the capture process more efficient and safer.

Chinese Patent Application Publication No. CN114180009A discloses a water pressure releaser, which includes: a support frame; a shell having a cavity formed therein; a sliding plug connected to the shell in a sliding and sealing manner and partially extending out of the shell, wherein a connecting portion is formed on an end face of an extending end of the sliding plug in an extending manner; an elastic component assembled in the shell and applying an elastic abutting force to the sliding plug; a lever rotatably connected to the support frame, wherein one end of the lever is hinged to the connecting portion, and another end of the lever is provided with a bearing portion; and a bearing member, wherein one end of the bearing member is rotatably connected to the support frame, and another end of the bearing member is mounted on the bearing portion. The present application solves the problems that the releaser in the prior art has a high manufacturing cost and a complex structure and is inconvenient to use due to the requirement to provide energy as power.

In the actual use of the above and similar water pressure releasers, it is not convenient for the staff to quickly release the water pressure releasers manually when dealing with emergencies. Meanwhile, such water pressure releasers are not equipped with an adjustment function, and have the disadvantage of dealing with a single water depth pressure, and thus have low flexibility, and it is not convenient for the staff to adjust the working water depth pressures of the water pressure releasers based on a use requirement. When there is a work requirement on different water depth pressures, it is necessary to use a plurality of water pressure releasers with different water depth pressures, which increases the use cost, and thus the present application is proposed.

SUMMARY

An objective of the present application is to provide a water pressure releaser, so as to solve the problems in the background.

To achieve the above objective, the present application provides the following technical solution. A water pressure releaser includes a shell, a movable limiting mechanism is mounted in a middle inside the shell, the shell is a hollow structure, a top groove is formed on an outer wall of a top of the shell, side grooves are formed on outer walls of two sides of the shell, a horizontal groove is formed on an outer wall of one port of the shell, a clamping mechanism for clamping and locking an object is mounted in the horizontal groove of the shell, a limit-releasing mechanism for fixing a position of the limiting mechanism and releasing the fixation by water depth pressure is mounted in another port of the shell, the limiting mechanism cooperates with the limit-releasing mechanism to complete the limiting and limit-releasing of the clamping mechanism, and an adjusting mechanism for adjusting a water depth pressure at which the limit-releasing mechanism performs limit release is mounted in the limiting mechanism.

Further, the limiting mechanism includes an air cylinder inserted in the shell, a vertical groove corresponding to the top groove is formed on an outer wall of a top of the air cylinder, a limiting wheel is provided in the vertical groove, a horizontal column is fixedly connected between outer walls of two sides of the air cylinder, the horizontal column is slidably connected in the side grooves of the shell, the limiting wheel is fixedly connected on the horizontal column and rotates with the horizontal column as a circle center, a fan-shaped groove is formed on an outer wall of one side of the air cylinder, a fixing block is mounted on a bottom of the fan-shaped groove, a through groove is formed on the fan-shaped groove, a first torsion spring with one end mounted on the fixing block is surrounded on a circumferential outer wall of the horizontal column, and another end of the first torsion spring is mounted on an outer wall of the limiting wheel by the through groove.

Further, the adjusting mechanism includes a plurality of locking grooves formed on the limiting wheel, a plurality of radial grooves are formed in the outer wall of the limiting wheel, the locking grooves correspond to the radial grooves, a first mounting column and a second mounting column are respectively mounted on outer walls of two sides of one of the locking grooves, and locking columns are mounted on the first mounting column and the second mounting column.

Further, the clamping mechanism includes a central column mounted between a top and a bottom of the shell, two clamping pincers are sleeved on an outer wall of the central column, the two clamping pincers are mutually attached to form a closed space, the clamping pincers rotate around the central column, a fixing column is further mounted between the top and the bottom of the shell, annular grooves matched with the fixing column are formed in the clamping pincers, the fixing column is positioned in the annular grooves, arc-shaped grooves are formed in the clamping pincers, a second torsion spring is surrounded on the outer wall of the central column, one end of the second torsion spring is fixedly connected to an outer wall of one of the clamping pincers, another end of the second torsion spring is fixedly connected to an outer wall of another clamping pincer by the arc-shaped groove, and a limiting groove is formed in one end of an outer wall of a top of each of the clamping pincers contacting the limiting mechanism.

Further, the limit-releasing mechanism includes a bearing column mounted on the shell, a connecting column is mounted on one end of the bearing column facing the air cylinder, a limit-releasing spring is mounted on the connecting column, and the limit-releasing spring is attached to an inner wall of a notch on the air cylinder.

Further, a hanging ring is mounted on an outer wall of the bearing column, when the two clamping pincers form a closed space, the limiting grooves on the two clamping pincers coincide, and the radial grooves on the limiting wheel are inserted into the coinciding limiting grooves of the two clamping pincers to complete the fixing and limiting of the clamping pincers.

Compared with the prior art, the present application has the following beneficial effects.

When the water pressure releaser is in a set water depth, the water pressure enables the air cylinder to move along a direction of the bearing column, so that the entire limiting mechanism is driven to move to release the limit on the clamping mechanism, and under the action of the second torsion spring, the two clamping pincers are disengaged and bounced open to achieve the deep water unlocking function; when the water pressure releaser is out of water, the limiting wheel may be pulled by a hand to rotate out of the limiting groove, so that the two clamping pliers are disengaged and bounced open, the manual unlocking function is achieved, and a target water depth pressure when the limit-releasing mechanism is operated may be adjusted based on an actual use requirement by adjusting mechanism, which is beneficial for operators to make adjustments based on an actual use requirement.

Meanwhile, the horizontal column is arranged in the side grooves, which plays a positioning role when the limit-releasing mechanism drives the limiting mechanism to move integrally, so that the movement of the limiting mechanism is more stable; the limiting wheel is provided with three locking grooves, when the locking column is mounted in a corresponding locking groove, which corresponds to three radial grooves on the limiting wheel, and the three radial grooves have three different depths when entering the limiting groove; and the three different depths are combined with the air pressure in the air cylinder and the limit-releasing spring to form different combinations corresponding to different water depth pressures. The hanging ring provided on the bearing column may facilitate carrying the water pressure releaser and also facilitate connection to the water pressure releaser.

Figure 1:
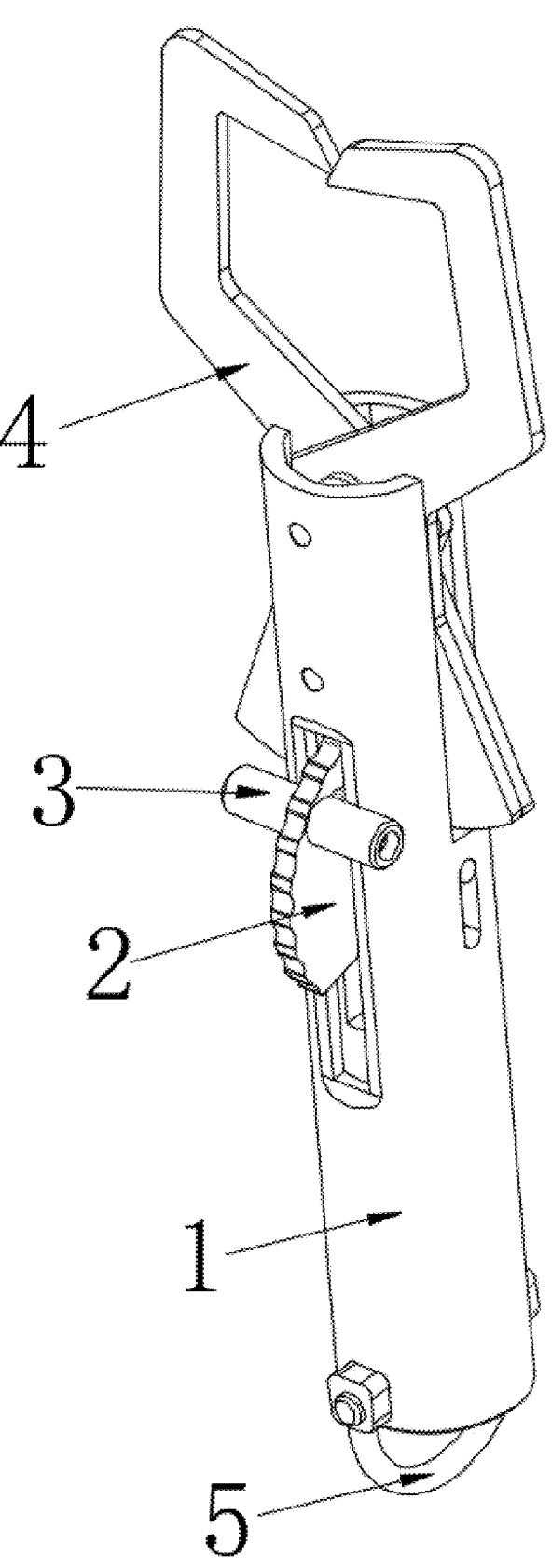
FIG. 1 is a schematic diagram of an entire structure according to the present application.

Reference numerals: 1: shell; 2: limiting mechanism; 201: air cylinder; 202: horizontal column; 203: limiting wheel; 204: fixing block; 205: first torsion spring; 206: notch; 207: radial groove; 3: adjusting mechanism; 301: locking groove; 302: locking column; 303: first mounting column; 304: second mounting column; 4: clamping mechanism; 401: central column; 402: clamping pincers; 403: fixing column; 404: second torsion spring; 405: limiting groove; 5: limit-releasing mechanism; 501: bearing column; 502: connecting column; 503: limit-releasing spring; 504: hanging ring; 6: top groove; and 7: side groove.

DETAILED DESCRIPTION OF EMBODIMENTS

The technical solutions in the embodiments of the present application will be clearly and completely described below with reference to the drawings in the embodiments of the present application. It is apparent that the described embodiments are only some, but not all, embodiments of the present application. Based on the embodiments of the present application, all other embodiments obtained by those of ordinary skill in the art without creative efforts fall within the protection scope of the present application.

The water pressure releaser can hold the captured fish firmly by the clamping function. When the fish escapes to deeper waters, the water pressure increases and the water pressure releaser automatically releases the fish, which ensures that the captured fish is not injured or loses lives due to excessive pressure. The unique design of the water pressure releaser not only improves the success rate of fish capture, but also protects the survival status of fish to the greatest extent.

As shown in FIGS. 1 to 7, the present application provides a technical solution: a water pressure releaser includes a shell 1, a movable limiting mechanism 2 is mounted in a middle inside the shell 1, the shell 1 is a hollow structure, a top groove 6 is formed on an outer wall of a top of the shell 1, side grooves 7 are formed on outer walls of two sides of the shell 1, a horizontal groove is formed on an outer wall of one port of the shell 1, a clamping mechanism 4 for clamping and locking an object is mounted in the horizontal groove of the shell 1, a limit-releasing mechanism 5 for fixing a position of the limiting mechanism 2 and releasing the fixation by water depth pressure is mounted in another port of the shell 1, the limiting mechanism 2 cooperates with the limit-releasing mechanism 5 to complete the limiting and limit-releasing of the clamping mechanism 4, and an adjusting mechanism 3 for adjusting a water depth pressure at which the limit-releasing mechanism 5 performs limit release is mounted in the limiting mechanism 2.

It should be noted that, during the use, the fish may be clamped and fixed by the clamping mechanism 4, and the position of the clamping mechanism 4 can be fixed by the limiting mechanism 2, that is, the clamping mechanism 4 is fixed to remain open or closed, and the limiting mechanism 2 may be manually operated, which is conducive to achieving the use requirements in special situations; the limit-releasing mechanism 5 cooperates with the limiting mechanism 2 to automatically release the connection between the clamping mechanism 4 and the fish after reaching a target water depth pressure; and the target water depth pressure of the limit-releasing mechanism 5 may be adjusted based on an actual use requirement by the adjusting mechanism 3, which is beneficial for operators to make adjustments based on an actual use requirement.

Figure 2:
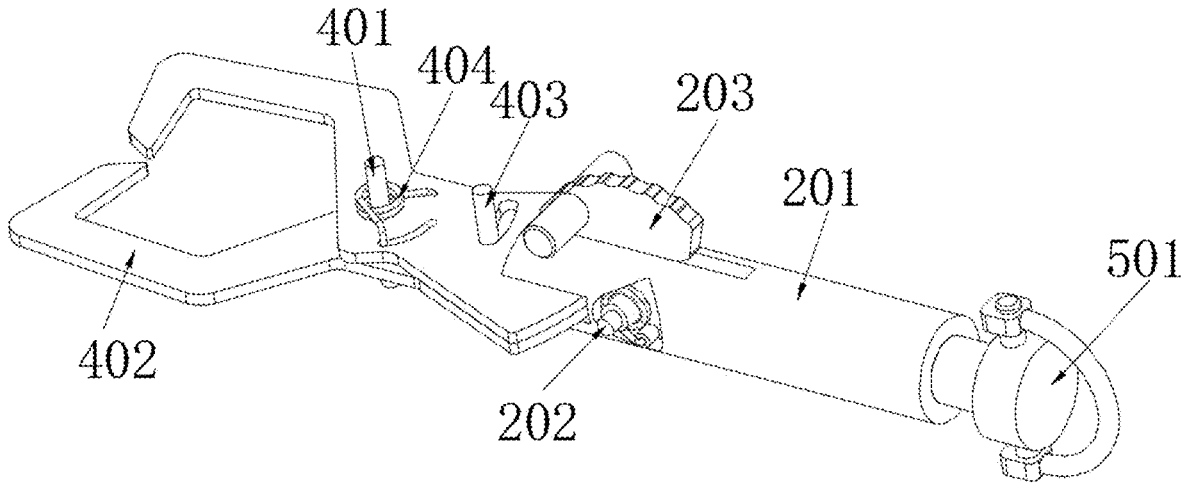
FIG. 2 is a schematic diagram of an internal structure of a shell according to the present application.
Figure 3:
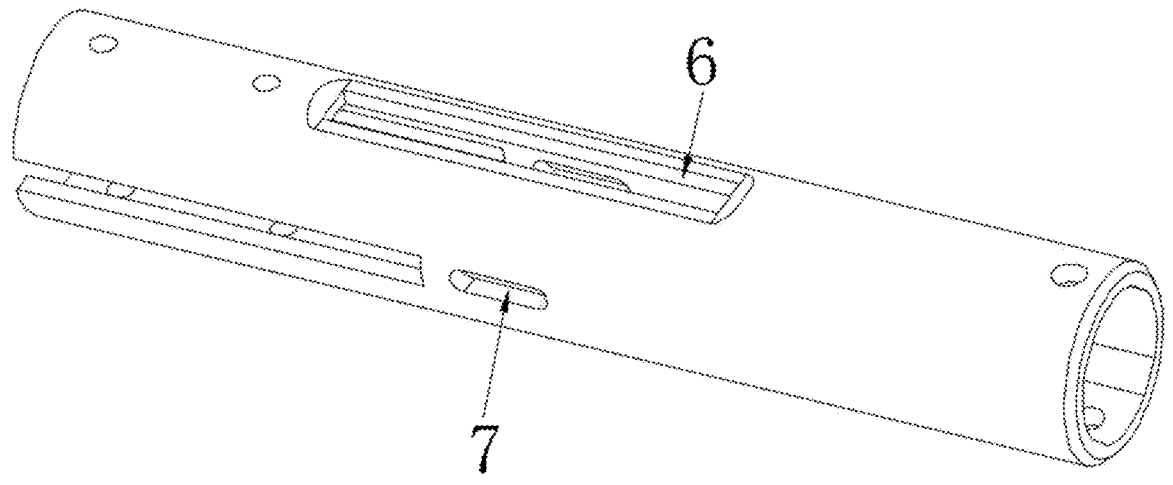
FIG. 3 is a schematic diagram of a structure of a shell according to the present application.
Figure 5:
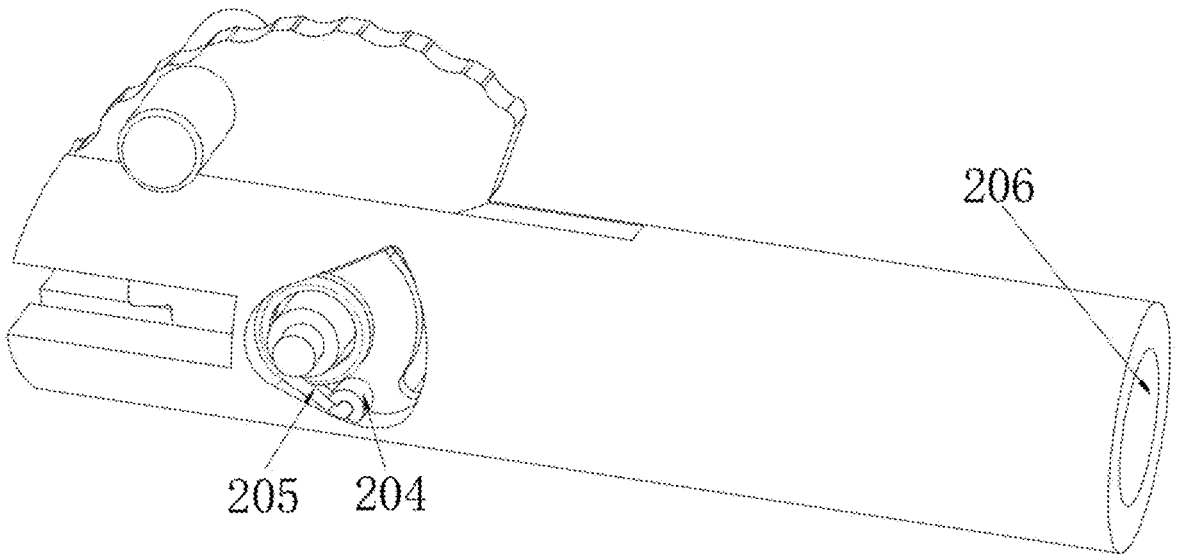
FIG. 5 is a schematic diagram of a side structure of an air cylinder according to the present application.
Figure 6:
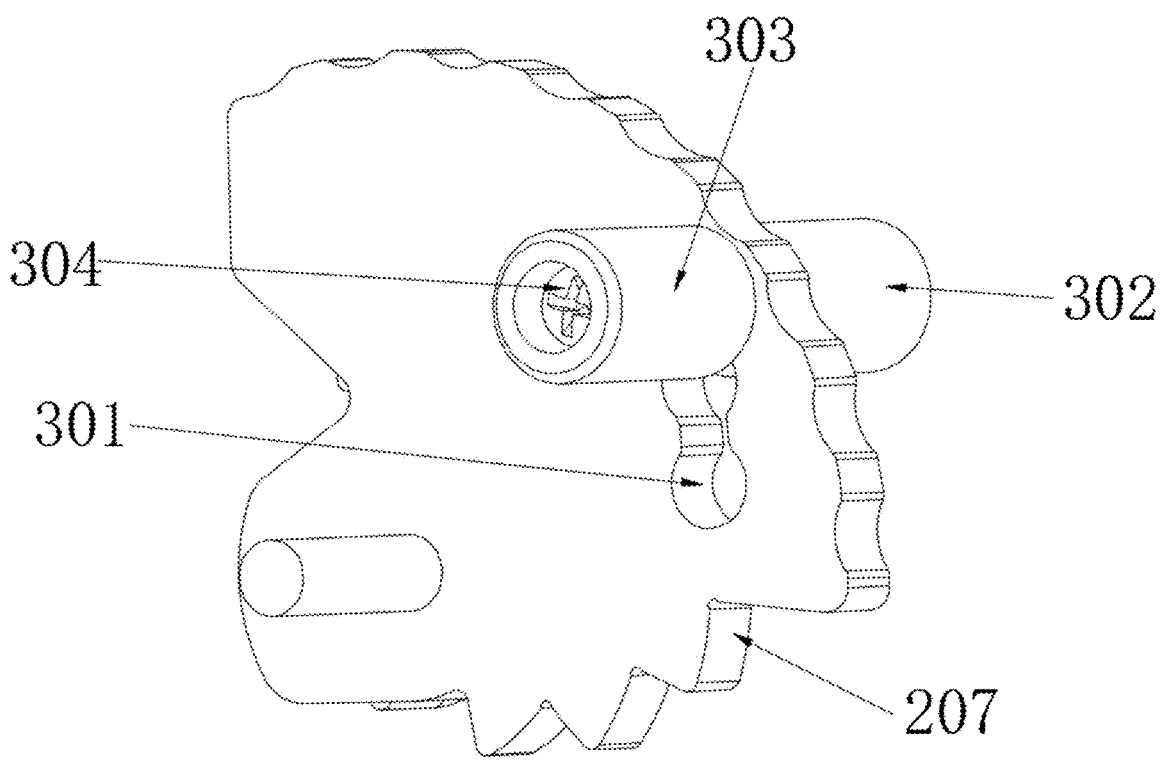
FIG. 6 is a schematic diagram of a structure of an adjusting mechanism according to the present application.

As shown in FIGS. 2, 5, and 6, the limiting mechanism 2 includes an air cylinder 201 inserted in the shell 1, a vertical groove corresponding to the top groove 6 is formed on an outer wall of a top of the air cylinder 201, a limiting wheel 203 is provided in the vertical groove, a horizontal column 202 is fixedly connected between outer walls of two sides of the air cylinder 201, the horizontal column 202 is slidably connected in the side grooves 7 of the shell 1, the limiting wheel 203 is fixedly connected on the horizontal column 202, the limiting wheel 203 rotates with the horizontal column 202 as a circle center, a fan-shaped groove is formed on an outer wall of one side of the air cylinder 201, a fixing block 204 is mounted on a bottom of the fan-shaped groove, a through groove is formed on the fan-shaped groove, a first torsion spring 205 with one end mounted on the fixing block 204 is surrounded on a circumferential outer wall of the horizontal column 202, and another end of the first torsion spring 205 is mounted on an outer wall of the limiting wheel 203 by the through groove.

It should be noted that an interior of the air cylinder 201 is a hollow structure, and the interior of the cylinder 201 is filled with gas; the horizontal column 202 is arranged in the side grooves 7, which plays a positioning role when the limit-releasing mechanism 5 drives the limiting mechanism 2 to move integrally, so that the movement of the limiting mechanism 2 is more stable; the first torsion spring 205 is arranged to make the limiting wheel 203 elastic, the limiting wheel 203 may be driven to rotate when an operator toggles the limiting wheel 203 by a hand, and then the limiting wheel 203 may be reset after rotation by the action of the first torsion spring 205; and the limit on the clamping mechanism 4 may be manually contacted by the rotation of the limiting wheel 203, which is conducive to the operator to manually contact the limit, and the release process is simple and fast.

As shown in FIG. 6, the adjusting mechanism 3 includes a plurality of locking grooves 301 formed on the limiting wheel 203, a plurality of radial grooves 207 are formed in the outer wall of the limiting wheel 203, the locking grooves 301 correspond to the radial grooves 207, a first mounting column 303 and a second mounting column 304 are respectively mounted on outer walls of two sides of one of the locking grooves 301, and locking columns 302 are mounted on the first mounting column 303 and the second mounting column 304.

It should be noted that the limiting wheel is provided with three locking grooves 301, when the locking column 302 is mounted in a corresponding locking groove 301, which corresponds to three radial grooves 207 on the limiting wheel 203, the three radial grooves 207 have three different depths when entering the limiting groove 405, and the three different depths are combined with the air pressure in the air cylinder 201 and the limit-releasing spring 503 to form different combinations corresponding to different water depth pressures; when the water pressure reaches a corresponding combination value, the air cylinder 201 retreats to a depth of the radial grooves 207 of the limiting wheel 203 in the limiting groove 405, in this case, there is no obstacle in the limiting groove 405, and the two clamping pincers 402 are bounced open under the action of the second torsion spring 404 to achieve the unlocking function.

Figure 7:
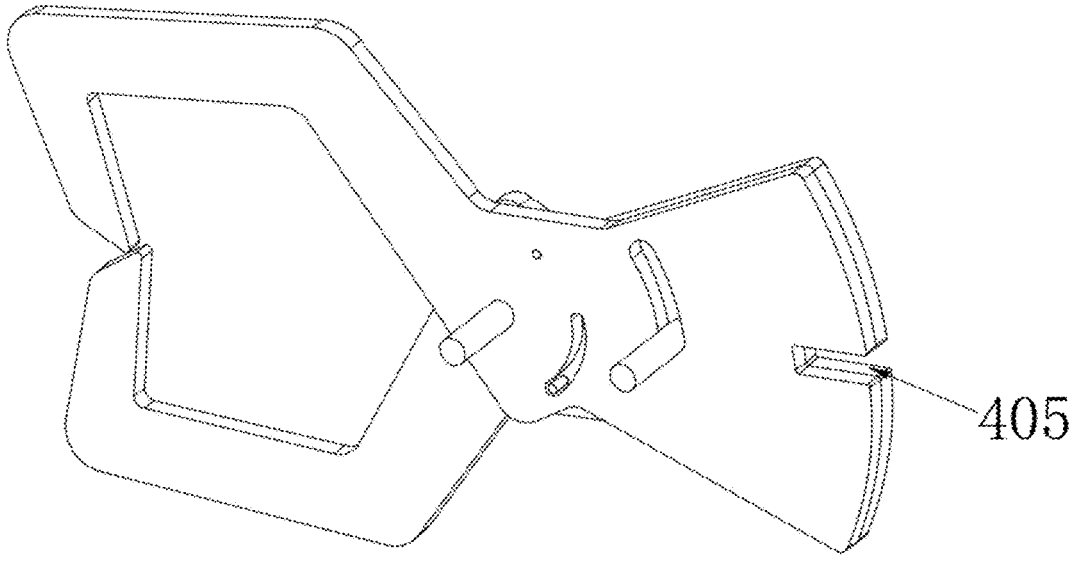
FIG. 7 is a schematic diagram of a structure of a limiting groove according to the present application.

As shown in FIGS. 2 and 7, the clamping mechanism 4 includes a central column 401 mounted between a top and a bottom of the shell 1, two clamping pincers 402 are sleeved on an outer wall of the central column 401, the two clamping pincers 402 are mutually attached to form a closed space, the clamping pincers 402 rotate around the central column 401, a fixing column 403 is further mounted between the top and the bottom of the shell 1, annular grooves matched with the fixing column 403 are formed in the clamping pincers 402, the fixing column 403 is positioned in the annular grooves, arc-shaped grooves are formed in the clamping pincers 402, a second torsion spring 404 is surrounded on the outer wall of the central column 401, one end of the second torsion spring 404 is fixedly connected to an outer wall of one of the clamping pincers 402, another end of the second torsion spring 404 is fixedly connected to an outer wall of another clamping pincer 402 by the arc-shaped groove, and a limiting groove 405 is formed in one end of an outer wall of a top of each of the clamping pincers 402 contacting the limiting mechanism 2.

It should be noted that the central column 401 is arranged at a midpoint of the two clamping pincers 402, the clamping pincers 402 rotate around the central column 401, when the limiting mechanism 2 limits the clamping mechanism 4, the two clamping pincers 402 form a closed space, and the fixing column 403 cooperates with the annular groove, so that a guiding effect is provided for the clamping pincers 402 during movement; and when the limiting mechanism 2 is manually moved or the limit-releasing mechanism 5 cooperates with the limiting mechanism 2 to release the limit on the clamping mechanism 4, the closed space formed by the two clamping pincers 402 may be opened through the action of the second torsion spring 404, and then the two clamping pincers 402 are opened.

Figure 4:
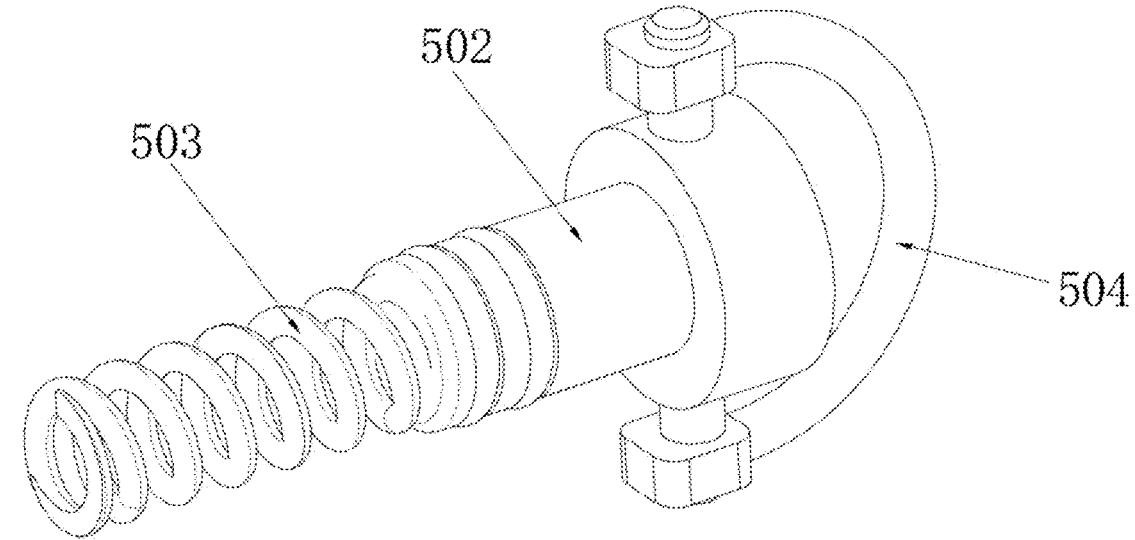
FIG. 4 is a schematic diagram of a structure of a limit-releasing mechanism according to the present application.

As shown in FIGS. 1 and 4, the limit-releasing mechanism 5 includes a bearing column 501 mounted on the shell 1, a connecting column 502 is mounted on one end of the bearing column 501 facing the air cylinder 201, a limit-releasing spring 503 is mounted on the connecting column 502, and the limit-releasing spring 503 is attached to an inner wall of a notch 206 on the air cylinder 201.

It should be noted that, when the limit-releasing mechanism 5 needs to be used, the entire water pressure release is in the water, and the water pressure reaches a certain value, that is, when the water pressure releaser is in a set water depth, the water pressure moves the air cylinder 201 along a direction of the bearing column 501, so as to drive the limiting mechanism 2 to move integrally and slide out, so that the radial grooves 207 on the limiting wheel 203 slide out of the limiting groove 405; under the action of the second torsion spring 404, the two clamping pincers 402 are disengaged and bounced open to achieve the deep water unlocking function; and when the water pressure releaser is out of water, the limiting wheel 203 may be pulled by a hand to rotate out of the limiting groove 405, so that the two clamping pliers 402 are disengaged and bounced open, the manual unlocking function is achieved.

As shown in FIGS. 1, 2 and 6, a hanging ring 504 is mounted on an outer wall of the bearing column 501, when the two clamping pincers 402 form a closed space, the limiting grooves 405 on the two clamping pincers 402 coincide, and the radial grooves 207 on the limiting wheel 203 are inserted into the coinciding limiting grooves 405 of the two clamping pincers 402 to complete the fixing and limiting of the clamping pincers 402.

It should be noted that the hanging ring 504 provided on the bearing column 501 may facilitate carrying the water pressure releaser and also facilitate connection to the water pressure releaser; when the clamping pincers 402 form a closed space, the radial grooves 207 on the limiting wheel 203 are inserted into the limiting groove 405 coincided with the two clamping pincers 402 to complete the fixing and limit on the clamping pincers 402, and when the clamping pincers 402 do not form a closed space, the radial grooves 207 on the limiting wheel 203 are not inserted into the limiting groove 405 coincided with the two clamping pincers 402.

Although the embodiments of the present application have been shown and described, it may be understood by those of ordinary skill in the art that various changes, modifications, substitutions, and alterations may be made to these embodiments without departing from the principle and purpose of the present application, and the scope of the present application is defined in the embodiments and equivalents thereof.

What is claimed is:

1. A water pressure releaser, comprising a shell (1) comprising an outer wall and two ports, wherein the shell (1) is a hollow structure, a top groove (6) is formed on the outer wall of a top of the shell (1), side grooves (7) are formed on the outer wall on two sides of the shell (1), a horizontal groove is formed on the outer wall adjacent a port of the shell (1), a clamping mechanism (4) for clamping and locking an object is mounted in the horizontal groove, a movable limiting mechanism (2) for the clamping mechanism is mounted inside a middle portion of the shell (1), a limit-releasing mechanism (5) for fixing a position of the limiting mechanism (2) and releasing the fixed position of the limiting mechanism at a set water depth pressure is mounted in another port of the shell (1), the limiting mechanism (2) cooperates with the limit-releasing mechanism (5) to complete the limiting and limit-releasing of the clamping mechanism (4), and an adjusting mechanism (3) for adjusting the set water depth pressure at which the limit-releasing mechanism (5) performs the limit release is mounted in the limiting mechanism (2).

2. The water pressure releaser according to claim 1, wherein the limiting mechanism (2) comprises an air cylinder (201) inserted in the shell (1), a vertical groove corresponding to the top groove (6) is formed on an outer wall of a top of the air cylinder (201), a limiting wheel (203) is provided in the vertical groove, a horizontal column (202) is fixedly connected between the outer walls of two sides of the air cylinder (201), the horizontal column (202) is slidably connected in the side grooves (7) of the shell (1), the limiting wheel (203) is fixedly connected on the horizontal column (202), the limiting wheel (203) rotates with the horizontal column (202) as a circle center, a fan-shaped groove is formed on an outer wall of one side of the air cylinder (201), a fixing block (204) is mounted on a bottom of the fan-shaped groove, a through groove is formed on the fan-shaped groove, a first torsion spring (205) with one end mounted on the fixing block (204) is surrounded on a circumferential outer wall of the horizontal column (202), and another end of the first torsion spring (205) is mounted on an outer wall of the limiting wheel (203) by the through groove.

3. The water pressure releaser according to claim 2, wherein the adjusting mechanism (3) comprises a plurality of locking grooves (301) formed on the limiting wheel (203), a plurality of radial grooves (207) are formed in the outer wall of the limiting wheel (203), the locking grooves (301) correspond to the radial grooves (207), a first mounting column (303) and a second mounting column (304) are respectively mounted on outer walls of two sides of one of the locking grooves (301), and locking columns (302) are mounted on the first mounting column (303) and the second mounting column (304).

4. The water pressure releaser according to claim 2, wherein the clamping mechanism (4) comprises a central column (401) mounted between a top and a bottom of the shell (1), two clamping pincers (402) are sleeved on an outer wall of the central column (401), the two clamping pincers (402) are mutually attached to form a closed space, the clamping pincers (402) rotate around the central column (401), a fixing column (403) is further mounted between the top and the bottom of the shell (1), annular grooves matched with the fixing column (403) are formed in the clamping pincers (402), the fixing column (403) is positioned in the annular grooves, arc-shaped grooves are formed in the clamping pincers (402), a second torsion spring (404) is surrounded on the outer wall of the central column (401), one end of the second torsion spring (404) is fixedly connected to an outer wall of one of the clamping pincers (402), another end of the second torsion spring (404) is fixedly connected to an outer wall of another clamping pincer (402) by the arc-shaped groove, and a limiting groove (405) is formed in one end of an outer wall of a top of each of the clamping pincers (402) contacting the limiting mechanism (2).

5. The water pressure releaser according to claim 4, wherein the limit-releasing mechanism (5) comprises a bearing column (501) mounted on the shell (1), a connecting column (502) is mounted on one end of the bearing column (501) facing the air cylinder (201), a limit-releasing spring (503) is mounted on the connecting column (502), and the limit-releasing spring (503) is attached to an inner wall of a notch (206) on the air cylinder (201).

6. The water pressure releaser according to claim 5, wherein a hanging ring (504) is mounted on an outer wall of the bearing column (501), when the two clamping pincers (402) form a closed space, the limiting grooves (405) on the two clamping pincers (402) coincide, and the radial grooves (207) on the limiting wheel (203) are inserted into the coinciding limiting grooves (405) of the two clamping pincers (402) to complete the fixing and limiting of the clamping pincers (402).

* * * * *